(12) United States Patent
Lakehal-Ayat et al.

(10) Patent No.: US 9,010,471 B2
(45) Date of Patent: Apr. 21, 2015

(54) WHEEL BEARING UNIT, AND MOTOR VEHICLE HAVING WHEEL BEARING UNIT

(71) Applicant: Ford Global Technologies, LLC, Dearborn, MI (US)

(72) Inventors: Mohsen Lakehal-Ayat, Aachen (DE); Michael Seemann, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/032,758

(22) Filed: Sep. 20, 2013

(65) Prior Publication Data

US 2014/0090909 A1   Apr. 3, 2014

(30) Foreign Application Priority Data

Sep. 21, 2012   (DE) .......................... 10 2012 217 000

(51) Int. Cl.
| | | |
|---|---|---|
| *B60K 1/00* | (2006.01) | |
| *F16C 33/58* | (2006.01) | |
| *B60K 7/00* | (2006.01) | |
| *F16C 41/00* | (2006.01) | |
| *B60K 17/04* | (2006.01) | |
| *B60K 17/356* | (2006.01) | |
| *F16C 19/18* | (2006.01) | |

(52) U.S. Cl.
CPC .............. *F16C 33/581* (2013.01); *B60K 7/0007* (2013.01); *F16C 41/004* (2013.01); *F16C 19/186* (2013.01); *B60K 17/043* (2013.01); *B60K 17/356* (2013.01); *B60K 2007/0038* (2013.01); *B60K 2007/0061* (2013.01)

(58) Field of Classification Search
USPC ........... 180/65.31, 65.51, 65.6, 65.7; 301/6.5, 301/6.91
See application file for complete search history.

(56) References Cited

U.S. PATENT DOCUMENTS

| | | | |
|---|---|---|---|
| 7,556,580 B2 * | 7/2009 | Saito et al. ..................... | 475/154 |
| 7,666,114 B2 * | 2/2010 | Lin et al. ........................ | 475/267 |
| 7,717,203 B2 * | 5/2010 | Yoshino et al. ............ | 180/65.51 |
| 8,550,197 B2 * | 10/2013 | Sgherri et al. ............. | 180/65.51 |
| 2014/0090909 A1 * | 4/2014 | Lakehal-Ayat et al. .... | 180/65.51 |

FOREIGN PATENT DOCUMENTS

| | | |
|---|---|---|
| DE | 10132610 A1 | 2/2003 |
| WO | WO 2011/098594 A1 | 8/2011 |

OTHER PUBLICATIONS

DE 10132610 A1 English Abstract.

* cited by examiner

*Primary Examiner* — John Walters
*Assistant Examiner* — James Triggs
(74) *Attorney, Agent, or Firm* — Jones Robb, PLLC; Raymond Coppiellie

(57) ABSTRACT

A wheel bearing unit comprises an inner ring and an outer ring. The outer ring is mounted rotatably and is arranged concentrically with respect to the inner ring. The inner ring serves to receive a wheel and the outer ring serves for fastening to a wheel support of a motor vehicle. The wheel bearing unit has, between the inner ring and the outer ring, a first ball row and a second ball row which is arranged parallel to the first ball row. A follower is arranged in a rotationally fixed manner with respect to an outer side of the inner ring between the first ball row and the second ball row. The follower is connected directly or indirectly to a rotor of an electric machine in a torque-transmitting manner.

22 Claims, 2 Drawing Sheets

WHEEL BEARING UNIT, AND MOTOR VEHICLE HAVING WHEEL BEARING UNIT

This application claims priority to German Patent Application No. 102012217000.6, filed on Sep. 21, 2012, which is hereby incorporated by reference in its entirety.

TECHNICAL FIELD

Aspects of the present disclosure relate to a wheel bearing unit having an integrated electric machine, and to a motor vehicle having a wheel bearing unit of this type.

BACKGROUND

Since approximately 1980, certain passenger vehicles have been provided with wheel bearings having an outer ring and an inner ring, and having an integrated flange being formed on the outer ring and on the inner ring. The outer ring and the inner ring of the wheel bearing are mounted rotatably with respect to one another by means of two ball rows which are arranged parallel to one another.

SUMMARY

Exemplary embodiments described herein provide devices which can exert a positive influence on vehicle safety and energy consumption. Further, exemplary embodiments described herein require minimal installation space and create little additional weight.

According to an exemplary embodiment, a wheel bearing unit comprises an inner ring configured to receive a wheel, an outer ring mounted rotatably with respect to the inner ring, a first ball row and a second ball row between the inner ring and the outer ring, and a follower arranged in a rotationally fixed manner with respect to an outer side of the inner ring. The outer ring may be configured to be fastened to a wheel support of a motor vehicle. The second ball row may be arranged parallel to the first ball row. The follower may be arranged between the first ball row and the second ball row. The follower may be connected directly or indirectly to a rotor of an electric machine in a torque-transmitting manner.

According to an exemplary embodiment, a motor vehicle comprises a battery, an energy management system connected to the battery and at least one wheel bearing unit according to the exemplary embodiments described herein, and at least one wheel connected to a motor-vehicle structure of the motor vehicle by the at least one wheel bearing unit. The at least one wheel bearing unit may be connected to the energy management system by power lines.

According to an exemplary embodiment, a wheel bearing unit comprises an inner ring configured to receive a wheel of a vehicle, an outer ring mounted rotatably to the inner ring, an electric machine including a rotor and a stator, and a follower arranged in a rotationally fixed manner with respect to the inner ring. The outer ring may be configured to be fastened to a wheel support of a motor vehicle. The stator may be fixed to the outer ring. The follower may be connected directly or indirectly to the rotor in a torque-transmitting manner.

According to an exemplary embodiment, a wheel bearing unit comprises an inner ring configured to receive a wheel of a vehicle, an outer ring mounted rotatably to the inner ring, a first bearing and a second bearing mounted between the inner ring and the outer ring, and an electric machine including a rotor and a stator. The outer ring may be configured to be fastened to a wheel support of a motor vehicle. The rotor may be located between the first bearing and the second bearing. The rotor may be a follower directly fixed to the inner ring to rotate with the inner ring and the stator is directly fixed to the outer ring.

BRIEF DESCRIPTION OF THE DRAWINGS

In the following text, exemplary embodiments will be explained using the associated drawings. The exemplary embodiments which are described here serve only for illustration and are not intended to restrict the scope of the present disclosure in any way. In the drawings.

DETAILED DESCRIPTION

Figure 1:
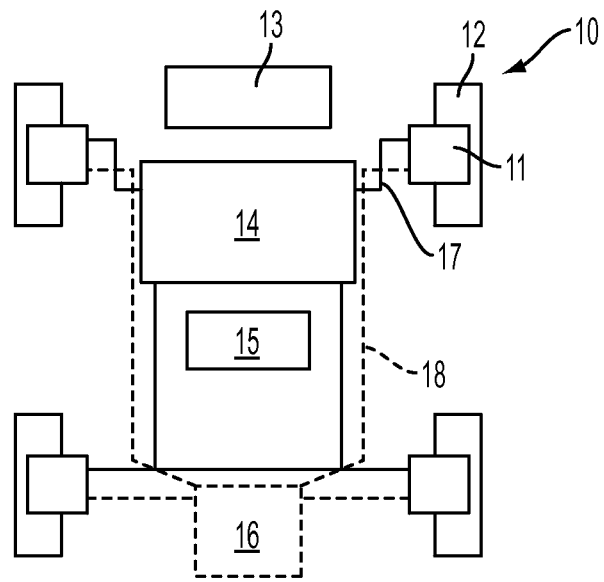
FIG. 1 shows a schematic diagram of a motor vehicle according to an exemplary embodiment.

Conventional motor vehicles may be equipped with electric machines that assist a main drive of the vehicle and serve as a generator for energy recovery during braking operations, that is to say for recuperation. Here, the main drive machine can likewise be an electric motor or an internal combustion engine.

One possible arrangement of an electric machine is the arrangement as a wheel hub motor. WO 2011098594 A1, for example, discloses a wheel hub drive for a motor vehicle having an electric motor which is drive-connected to an input element of a transmission, the transmission having an output element which is connected to a shaft section, by which a wheel of the motor vehicle can be driven. Furthermore, a sensor is provided for monitoring the speed of the drive, the sensor comprising a sensor element which is arranged in a rotationally fixed manner and a rotatable sensor element.

According to an exemplary embodiment of the present disclosure, a wheel bearing unit comprises an inner ring and an outer ring mounted rotatably and arranged concentrically with respect to the inner ring. The inner ring serves to receive a wheel and the outer ring serves for fastening to a wheel support of a motor vehicle. The wheel bearing unit has, between the inner ring and the outer ring, a first ball row and a second ball row which is arranged parallel to the first ball row. According to an exemplary embodiment, the inner ring of the wheel bearing unit has an inner-ring outer side. A follower may be arranged in a rotationally fixed manner with respect to the inner ring on said inner-ring outer side between the first ball row and the second ball row. The follower may be connected directly or indirectly to a rotor of an electric machine in a torque-transmitting manner.

In the context of the exemplary embodiments described herein, "direct" means that a torque transmission takes place without further elements which are arranged between the inner ring and the rotor. In the context of the exemplary embodiments described herein, "indirect" means that a torque transmission takes place by means of torque-transmitting elements which are arranged additionally between the inner ring and the rotor.

A standardized component may therefore be advantageously provided which, as an assembly, can be integrated in precisely as simple a way as conventional wheel bearings into the production of motor vehicles. In accordance with the present teachings, the wheel bearing unit described herein does not require substantially more installation space than a conventional wheel bearing and the weight of the vehicle is increased to a relatively small extent in comparison with previous solutions.

According to an exemplary embodiment, the outer ring of the wheel bearing unit has an outer-ring inner side. The follower may be the rotor itself, according to an exemplary embodiment, and a stator of the electric machine may be arranged in a rotationally fixed manner with respect to the outer ring around the rotor on the outer-ring inner side.

The wheel bearing unit, according to an exemplary embodiment, may have few individual parts, which leads to a lower weight and to easier production capability. Further, an arrangement in which a rotor is positioned between the two ball rows may facilitate a permanently dimensionally correct spacing between the rotor and the stator, as well as high operational strength.

According to another exemplary embodiment, the follower may be a drive element configured to engage with an output element mounted rotatably on the outer ring and connected to the rotor in a torque-transmitting manner. This arrangement advantageously affords the possibility of realizing a transmission ratio between the inner ring and the rotor. In one exemplary embodiment, the drive element and the output element form a step-down gear mechanism. The rotor rotational speed of the electric machine may therefore be increased in comparison with the rotational speed of the inner ring. The electric machine can thus be operated more favorably as a generator, because generators with a small installation space are more powerful at high rotational speeds. Conversely, the electric machine can act on the inner ring with a higher torque during motor operation.

In accordance with the present teachings, the wheel bearing unit may be advantageously configured in such a way that both the drive element and the output element are spur gears. Spur gears form an inexpensive and long-lasting option of designing a gear stage.

In accordance with an exemplary embodiment of the wheel bearing unit described herein, the electric machine is a brushless DC machine. Brushless DC machines require very little maintenance and have a long service life, which minimizes servicing costs.

The wheel bearing unit can be used both as a motor and as a generator. The wheel bearing unit, according to an exemplary embodiment, can therefore be used in a motor vehicle for driving, or at least for drive assistance and for energy recovery.

The wheel bearing unit, according to the various exemplary embodiments described herein, may be arranged in a motor vehicle. The vehicle may have a battery, an energy management system connected to the battery, and at least one wheel bearing unit according to the various exemplary embodiments described herein. At least one wheel may be connected to the motor-vehicle structure via the wheel bearing unit and the at least one wheel bearing unit may be connected via power lines to the energy management system of the vehicle.

In this way, the advantages of the wheel bearing unit as a component benefit the motor vehicle. During motor operation, the main drive of the motor vehicle can be assisted by the wheel bearing units. Thus, the motor vehicle can be kept rolling at speed with low energy expenditure. In addition, additional torque can be transmitted to the wheels in acceleration phases. If the motor vehicle reduces its speed, the wheel bearing units can recover energy as generators and therefore ensure an energy-saving drive.

According to an exemplary embodiment, each wheel of a motor vehicle is fastened to the motor vehicle by a wheel bearing unit, according to the exemplary embodiments described herein, and the wheel bearing units are connected via communication lines to at least one assistance system of the motor vehicle.

It is therefore made possible that the wheel bearing units can be actuated by the assistance systems and can serve to intervene in the driving state of the motor vehicle. According to an exemplary embodiment, the wheel bearing units are connected to an electronic stability program and/or an anti-lock brake system. As a result, the wheel bearing units also can serve as sensors for the assistance systems, eliminating the need for additional sensors. The wheel bearing units can serve, for example, as wheel rotational speed sensors.

FIG. 1 shows a schematic diagram of a motor vehicle 10 according to an exemplary embodiment. The motor vehicle 10 is preferably provided with an additional main engine (not shown), particularly an internal combustion engine, as a main drive. The exemplary motor vehicle 10 has four wheels 12, which are, according to an exemplary embodiment, each fastened by a wheel bearing unit 11 to the vehicle structure of the motor vehicle 10. According to an exemplary embodiment, only the wheels 12 of one axle are connected by wheel bearing units 11. For example, the axle which is driven by the main engine may have wheels 12 connected by wheel bearing units 11. In another example, the non-driven axle has wheels 12 connected by wheel bearing units 11. Thus, the wheel bearing units 11 are suitable both for driven wheels and for non-driven wheels, such as on, for example, all axles of a vehicle. According to an exemplary embodiment, the wheel bearings 11 comprise an electric machine 20, as will be discussed below with regard to the exemplary embodiments of FIGS. 3 and 4.

Electric energy can be fed to or removed from the wheel bearing units 11 via power lines 17. If the wheel bearing units 11 act as a generator, they output electric energy. In contrast, if the wheel bearing units 11 serve as motors, they require electric energy, such as from the battery 13 of the motor vehicle. To this end, the wheel bearing units 11 are connected electrically via the power lines 17 to an energy management system ("EMS") 14 of vehicle 10, according to an exemplary embodiment. The EMS 14 supplies electric energy to the wheel bearing units 11 when they are operated as a motor, and the EMS 14 directs the electric energy obtained from the wheel bearing units 11 in generator operation, such as for storage in the battery 13, or the EMS 14 distributes the electric energy for other uses, such as to supply energy consumers 15 of the vehicle, i.e., for the direct operation of energy consumers 15, such as devices powered via electricity.

The wheel bearing units 11, according to an exemplary embodiment, are connected via communication lines 18 to assistance systems 16 of the motor vehicle 10. For example, wheel bearing units 11 may be connected via communication lines 18 to an anti-lock brake system ("ABS"), and/or an electronic stability program ("ESP"). Data may be exchanged between the assistance systems 16 and the wheel bearing units 11 via the communication lines 18. According to an exemplary embodiment, data can be sent to individual wheel bearing units 11 and data can be received from individual wheel bearing units 11. For instance, the wheel bearing units 11 can act as wheel sensors and can determine, for example, data about wheel rotational speed and wheel torque. Use of the wheel bearing units in this manner may replace alternative sensors which have previously been used, such as an ABS wheel rotational speed sensor or an output shaft torque sensor. This advantageously serves to reduce the cost of manufacturing a vehicle that includes one or more wheel bearing units 11.

In accordance with another exemplary embodiment of the present teachings, the wheel bearing units 11 can serve in motor operation as an auxiliary drive to assist the main engine of the motor vehicle 10. It is thus provided, for example, to use the wheel bearing units 11 as a motor while the motor vehicle 10 is rolling freely. It is thus possible to compensate for a rolling resistance of the tires and the motor vehicle can be kept at speed with minimal use of energy.

In generator operation, the wheel bearing units 11 can serve to convert kinetic energy of the motor vehicle 10 into electric energy. Such kinetic energy would otherwise be converted into thermal energy during braking, and would not otherwise be utilized. It is therefore possible to recover kinetic energy by means of the wheel bearing units 11.

The wheel bearing units 11 may have a plurality of functions. They may serve as a connecting member between a wheel 12 and the motor vehicle 10, as a motor for assisting the main drive of the motor vehicle 10, as a generator for converting kinetic energy of the motor vehicle 10 into electric energy, and/or as sensors. All of these functions make it possible to operate the motor vehicle 10 with less energy. If the motor vehicle 10 has an internal combustion engine as main drive unit, the fuel consumption and emissions of the engine can advantageously be reduced.

Figure 2:
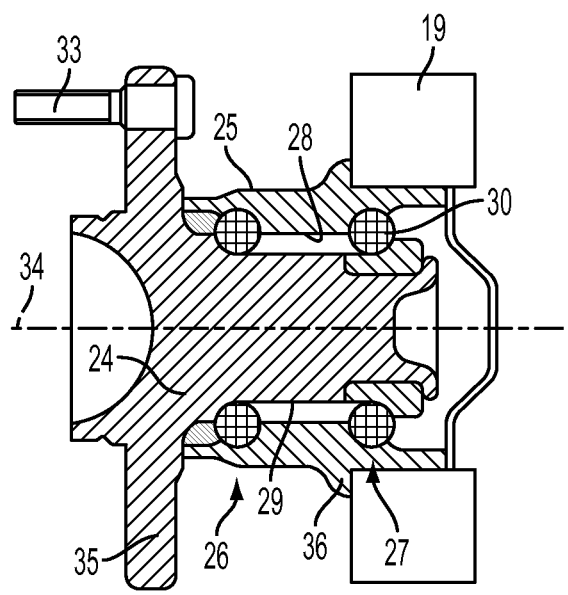
FIG. 2 shows a conventional wheel bearing.

FIG. 2 shows a conventional wheel bearing of the third. The wheel bearing has an inner ring 24 and an outer ring 25. The outer ring 25 is arranged concentrically on the same center axis 34 as the inner ring 24. The outer ring 25 encloses the inner ring 24 in a plane perpendicularly with respect to the center axis 34, with the result that an inner side 28 of outer ring 25 faces an outer side 29 of inner ring 24.

As shown in FIG. 2, the inner ring 24 protrudes out of the outer ring 25 on one side of the bearing along the longitudinal direction of center axis 34. This is particularly shown on the left-hand side of the bearing in FIG. 2. At this point, the inner ring 24 is provided with an inner-ring flange 35 that serves to receive a brake disk (not shown) and a wheel (not shown). To this end, the inner-ring flange 35 has elements for receiving fastening elements 33. For instance, a screw is shown in FIG. 2 as fastening element 33.

On the opposite side of the wheel bearing, with regard to the center axis 34 shown on the right-hand side of FIG. 2, the outer ring 25 has an outer-ring flange 36. The flange 36 serves to fasten the wheel bearing to the vehicle structure. In particular, wheel bearings are fastened to a wheel support 19. The wheel support 19 is shown diagrammatically in FIG. 2.

The wheel bearing is an antifriction bearing with a first ball row 26 and a second ball row 27. As shown in FIG. 2, the ball rows 26 and 27 are arranged parallel to one another and concentrically with respect to the center axis 34. In both rows 26 and 27, balls act as rolling bodies 30.

Figure 3:
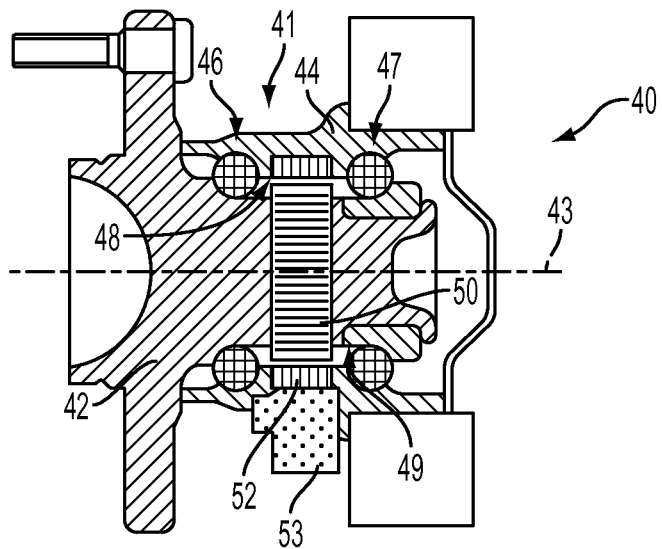
FIG. 3 shows a cross-sectional side view of an exemplary embodiment of a wheel bearing unit in accordance with the present teachings.
Figure 4:
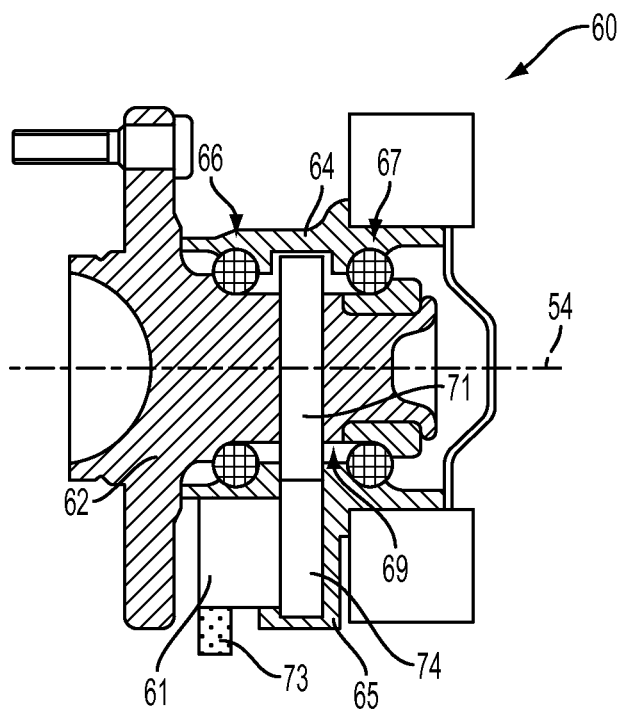
FIG. 4 shows a cross-sectional side view of an alternative exemplary embodiment of a wheel bearing unit in accordance with the present teachings.

A first exemplary embodiment of a wheel bearing unit 40 is shown in FIG. 3 and a second exemplary embodiment of a wheel bearing unit 50 is shown in FIG. 4. The exemplary embodiments of FIGS. 3 and 4 comprise all the components discussed above with regard to the exemplary embodiment of FIG. 2. In addition, both exemplary embodiments have an electric machine (element 41 in the exemplary embodiment of FIG. 3, element 61 in the exemplary embodiment of FIG. 4) with an associated connector unit (element 53 in the exemplary embodiment of FIG. 3, element 73 in the exemplary embodiment of FIG. 4). The electric machine 41, 61 of the exemplary embodiments of FIGS. 3 and 4 can serve here both as a motor and as a generator. The electric machine 41, 61 may be, for example, a brushless DC machine with a rotor and a stator. Here, the rotor comprises, for example, a permanent magnet ring and the stator has, for example, a plurality of electromagnets. The position of the rotor may be measured continuously and the electromagnets in the stator may be correspondingly commutated. The construction of a brushless DC machine is familiar to one of ordinary skill in the art and therefore will not to be explained here in greater detail.

According to an exemplary embodiment, electric machine 41, 61 is designed in such a way that it may function as a generator and a motor, with consideration of the driving state of the motor vehicle 10. Here, on account of the relatively small installation space which is available and the dimensions of the electric machine 41, 61 which are dependent thereon, the power output of the electric machine 41, 61 is limited to, for example, 40 W for rotational speeds between 0 and 1600 rpm. In the case of four wheels, this therefore results in a system output of approximately 160 W.

In the exemplary embodiment of FIG. 3, the wheel bearing unit 40 comprises a rotor 50. Rotor 50 may be seated as a follower directly on inner ring 42. The rotor 50 may be arranged on the outer side 49 of inner ring 42 between the two ball rows 46 and 47. Thus, the rotor 50 may be connected fixedly to the inner ring 42 so as to rotate with inner ring 42. The rotor 50 may be arranged concentrically with respect to the center axis 43 of wheel bearing unit 40.

In addition, in the exemplary embodiment of FIG. 3 the wheel bearing unit 40 may further comprise a stator 52, which is arranged around the rotor 50. The stator 52 may be arranged on the inner side 48 of the outer ring 44 between the two ball rows 46 and 47. Thus, the stator 52 may be connected fixedly to the outer ring 44 so as to rotate with the outer ring 44. The stator 52 may be arranged concentrically with respect to the center axis 43 of wheel bearing unit 40.

A connector unit 53 of the electric machine 41 may be provided on the stator 52, and arranged in a rotationally fixed manner with respect to the outer ring 44, in accordance with the present teachings. Via the connector unit 53, the electric machine 41 may be supplied with electric energy when the wheel bearing unit 40 acts as a motor. Further, the connector unit 53 may direct energy when the wheel bearing unit 40 acts as generator to recover energy. By means of the connector unit 53, the wheel bearing unit 40 can be connected to the energy management system 14 of the vehicle 10 of the exemplary embodiment of FIG. 1. Thus, the wheel bearing unit 40 may optionally be used with assistance systems 16 of the motor vehicle 10.

FIG. 4 shows an alternative exemplary embodiment of a wheel bearing unit 61 in accordance with the present teachings. The wheel bearing unit 61 comprises a drive element 71 which is seated as a follower directly on the inner ring 62. The drive element 71 is arranged on the outer side 69 of inner ring 62, and may be positioned between two ball rows 66 and 67. The drive element 71 may be connected fixedly to the inner ring 62 so as to rotate with inner ring 62. According to an exemplary embodiment, drive element 71 is arranged concentrically with respect to the center axis 54.

The drive element 71 may be connected indirectly to the rotor (rotor and stator of the electric machine 61 are not shown individually in FIG. 4) via an output element 74 in a torque-transmitting manner. According to an exemplary embodiment, the output element 74 may be mounted on a flange 65 of the outer ring 64. As a result, output element 74 can be rotated about an axis that is arranged parallel to and spaced apart from the center axis 54. The drive element 71 and the output element 74, according to an exemplary embodiment, are two spur gears which mesh with one another. The drive and output elements 71 and 74 can also be different gear elements, according to an alternative exemplary embodiment. However the drive element 71 and the output element 74 are not limited to only a configuration in which drive element 71 and output element 74 are directly engaged with one another. For instance, it is contemplated that further gear elements and/or gear stages may be arranged between the drive element 71 and the output element 74.

According to one exemplary embodiment, the drive element 71 and the output element 74 are designed as a step-down gear stage. As a result, the rotational speed at the rotor (not shown here) is increased when electric machine 61 acts as a generator, and the torque at the inner ring 62 is increased when electric machine 61 acts as a motor.

A connector unit 73 also may be connected to the stator (not shown in FIG. 4). Via the connector unit 73, the electric machine 61 may be supplied with electric energy in motor operation and the energy which is converted into electric energy in generator operation may be removed.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

It is to be understood that the particular examples and embodiments set forth herein are non-limiting, and modifications to structure, dimensions, materials, and methodologies may be made without departing from the scope of the present teachings.

Other embodiments in accordance with the present disclosure will be apparent to those skilled in the art from consideration of the specification and practice of the invention disclosed herein. It is intended that the specification and examples be considered as exemplary only, with a true scope and spirit being indicated by the following claims.

What is claimed is:

1. A wheel bearing unit comprising:
an inner ring configured to receive a wheel;
an outer ring mounted rotatably with respect to the inner ring, wherein the outer ring is configured to be fastened to a wheel support of a motor vehicle;
a first ball row and a second ball row between the inner ring and the outer ring, wherein the second ball row is arranged parallel to the first ball row; and
a follower arranged in a rotationally fixed manner with respect to an outer side of the inner ring between the first ball row and the second ball row;
wherein the follower is connected directly or indirectly to a rotor of an electric machine in a torque-transmitting manner.

2. The wheel bearing unit as claimed in claim 1, wherein the follower is the rotor, and wherein a stator of the electric machine is arranged in a rotationally fixed manner with respect to an inner side of the outer ring around the rotor.

3. The wheel bearing unit as claimed in claim 1, wherein the follower is a drive element which is in engagement with an output element, the output element being mounted rotatably on the outer ring and connected to the rotor in a torque-transmitting manner.

4. The wheel bearing unit as claimed in claim 3, wherein the drive element is a spur gear and the output element is a spur gear.

5. The wheel bearing unit as claimed in claim 3, wherein the drive element and the output element form a step-down gear mechanism.

6. The wheel bearing unit as claimed in claim 1, wherein the electric machine is a brushless DC machine.

7. The wheel bearing unit as claimed in claim 1, wherein the outer ring is arranged concentrically with respect to the inner ring.

8. A motor vehicle comprising:
a battery;
an energy management system connected to the battery and at least one wheel bearing unit as claimed in claim 1; and
at least one wheel connected to a motor-vehicle structure of the motor vehicle by the at least one wheel bearing unit;
wherein the at least one wheel bearing unit is connected to the energy management system by power lines.

9. The motor vehicle as claimed in claim 8, wherein each wheel of the motor vehicle is fastened to the motor vehicle by a wheel bearing unit as claimed in claim 1, and at least one of the wheel bearing units are connected via communication lines to at least one assistance system of the motor vehicle.

10. A wheel bearing unit, comprising:
an inner ring configured to receive a wheel of a vehicle;
an outer ring mounted rotatably to the inner ring, wherein the outer ring is configured to be fastened to a wheel support of a motor vehicle;
an electric machine including a rotor and a stator, wherein the stator is fixed to the outer ring; and
a follower arranged in a rotationally fixed manner with respect to the inner ring;
wherein the follower is connected directly or indirectly to the rotor in a torque-transmitting manner.

11. The wheel bearing unit as claimed in claim 10, wherein the follower is fixed to the inner ring to rotate with the inner ring.

12. The wheel bearing unit as claimed in claim 10, further comprising an output element engaged with the follower to indirectly connect the follower with the rotor.

13. The wheel bearing unit as claimed in claim 12, wherein the output element is mounted to the outer ring such that the output element may be rotated about an axis.

14. The wheel bearing unit as claimed in claim 13, wherein the axis of the output element is parallel to and spaced apart from a center axis of the inner ring and the outer ring.

15. The wheel bearing unit as claimed in claim 12, wherein both the follower and the output element comprise gears.

16. The wheel bearing unit as claimed in claim 15, wherein the follower and the output element are configured as a step-down gear stage.

17. The wheel bearing unit as claimed in claim 10, further comprising first and second bearings mounted between the inner and outer ring, wherein the follower is arranged between the first and second bearings.

18. The wheel bearing unit as claimed in claim 17, wherein the first and second bearings are spaced apart from one another along a central axis of the inner ring and outer ring.

19. A wheel bearing unit, comprising:
an inner ring configured to receive a wheel of a vehicle;

an outer ring mounted rotatably to the inner ring, wherein the outer ring is configured to be fastened to a wheel support of a motor vehicle;

a first bearing and a second bearing mounted between the inner ring and the outer ring; and an electric machine including a rotor and a stator, wherein the rotor is located between the first bearing and the second bearing;

wherein the rotor is a follower directly fixed to the inner ring to rotate with the inner ring and the stator is directly fixed to the outer ring.

20. The wheel bearing unit as claimed in claim 1, wherein each of the first and second ball rows is in direct engagement with at least one of the inner ring and the outer ring.

21. The wheel bearing unit as claimed in claim 10, wherein the rotor is located between the inner ring and the outer ring.

22. The wheel bearing unit as claimed in claim 19, wherein each of the first and second bearing is in direct engagement with at least one of the inner ring and the outer ring.

* * * * *